(12) United States Patent
Harris et al.

(10) Patent No.: US 7,055,550 B2
(45) Date of Patent: ***Jun. 6, 2006

(54) FLUID DELIVERY SYSTEM AND MOUNTING PANEL THEREFOR

(76) Inventors: James M. Harris, 969 Rose Ave., Menlo Park, CA (US) 94025; Selser J. Michael, 1163 Innsbruck St., Livermore, CA (US) 94550

( * ) Notice: Subject to any disclaimer, the term of this patent is extended or adjusted under 35 U.S.C. 154(b) by 0 days.

This patent is subject to a terminal disclaimer.

(21) Appl. No.: 11/152,582

(22) Filed: Jun. 14, 2005

(65) Prior Publication Data

US 2005/0241707 A1    Nov. 3, 2005

Related U.S. Application Data

(63) Continuation of application No. 10/377,831, filed on Mar. 3, 2003, now Pat. No. 6,907,904.

(51) Int. Cl.
*F16K 11/10* (2006.01)
(52) U.S. Cl. ....................................................... 137/884
(58) Field of Classification Search ................ 137/269, 137/270, 271, 597, 884
See application file for complete search history.

(56) References Cited

U.S. PATENT DOCUMENTS

| | | | | |
|---|---|---|---|---|
| 3,584,651 A | * | 6/1971 | Paschke | 137/625.66 |
| 3,646,963 A | * | 3/1972 | Klee | 137/884 |
| 3,957,079 A | * | 5/1976 | Whiteman | 137/596.18 |
| 4,449,426 A | * | 5/1984 | Younger | 477/127 |
| 5,803,124 A | * | 9/1998 | Newton et al. | 137/884 |

* cited by examiner

*Primary Examiner*—John Fox
(74) *Attorney, Agent, or Firm*—The Law Office of Tina M. Lessani

(57) ABSTRACT

A novel fluid delivery system includes a mounting panel, where the mounting panel includes channels that define the flow of fluid between any flow-control components mounted on the mounting panel. The mounting panel comprises a top plate and a bottom plate, and the channels are carved out of the underside of the top plate and are enclosed by the bottom plate. In a complex fluid delivery system having many fluid channels, the mounting panel may include one or more interior panels with additional channels carved out of the interior plates to accommodate all routing paths. The channels run in two or more directions to connect two or more gas/channel sticks together.

24 Claims, 10 Drawing Sheets

BCB Application for Mounting Panel

Option 1: Uniform coating to one plate

| | |
|---|---|
| 1 | Clean top plate and bottom plate in $H_2O_2$ + $NH_3OH$ solution. |
| 2 | Rinse and dry in a vacuum oven at 110 °C. |
| 3 | Using metal roller, coat top plate uniformly. |
| 4 | Bake top plate at 100 °C for 30 min. to remove solvents. |
| 5 | Align bottom plate over top plate and press together. |
| 6 | Using press, apply uniform pressure over both plates. |
| 7 | Cure assembled plates at 250 °C for 4 hours. |

Option 2: Coating the channels of top plate

| | |
|---|---|
| 1 | Clean top plate and bottom plate in $H_2O_2$ + $NH_3OH$ solution. |
| 2 | Rinse and dry in a vacuum oven at 110 °C. |
| 3 | Using hyperdermic dispenser, apply a thin line of material to just outline each channel. |
| 4 | Bake top plate at 100 °C for 30 min. to remove solvents. |
| 5 | Align bottom plate over top plate and press together. |
| 6 | Using press, apply uniform pressure over both plates. |
| 7 | Cure assembled plates at 250 °C for 4 hours. |

Figure 9

|  | 1.125" Surface Mount Gas Panel | Fluid Delivery System Made in Accordance with One Embodiment of Present Invention |
|---|---|---|
| # Channel | 12 | 12 |
| Length, in. | 19 | 4.5 |
| Width, in. | 17.7 | 16 |
| Area, sq.in. | 336 | 70 |
| Weight, lbs. | 90 | 19 |
| C seals | 156 | 80 |
| filter | 12 | 12 |
| Manifold Positions | 84 | 32 |
| MFC's | 12 | 12 |
| MFC Electronics |  | 4 |
| Pressure Regulator | 12 | 12 |
| Pressure Transducer | 12 | 12 |
| Shut-off valves | 60 | 60 |
| SMC Pneumatic valves | 60 | 12 |
| VCR fittings | 24 | 18 |
| Welds | 102 | 18 |

*FIG. 10*

FLUID DELIVERY SYSTEM AND MOUNTING PANEL THEREFOR

RELATED APPLICATIONS

This application is a continuation of U.S. patent application No. 10/377,831, filed on Mar. 3, 2003 now U.S. Pat. No. 6,907,904, and titled "Fluid Delivery and Mounting Panel Therefor," the contents of which are incorporated by reference as if fully disclosed herein.

BACKGROUND OF THE INVENTION

1. Field the Invention

The present inventions relates generally to gas panels and fluid delivery systems, and more specifically to a mounting panel in a fluid delivery system.

2. Description of the Background Art

High purity gas delivery systems, like those used in semiconductor manufacturing or other tightly controlled processes, typically use a source of high purity gas that is distributed and controlled through a series of gas distribution and control components, such as a mass flow controller, one or more pressure sensors and/or regulators, one or more filters or purifiers, and shutoff valves. In semiconductor processing, a series-connected set of such components is usually referred to as a "gas stick" or "gas channel." The components used and their particular configuration in a gas stick can vary depending upon design and application.

In a typical semiconductor processing arrangement, multiple gas sources are connected to the chamber through multiple gas sticks, which are typically mounted on blocks, a frame, or a panel to create a fluid delivery system often referred to as a "gas panel."

In creating gas panels, different methods of connecting the gas sticks and of mounting them have been developed. FIG. 1 illustrates a prior art gas panel 100 made up of hundreds of discrete components, such as valves 102, filters 104, flow regulators 106, pressure regulators 107, pressure transducer 109, and connections 108, which are connected together by tens, or hundreds, of feet of tubing 110.

As individual components in gas panels shrank in size, different methods of connecting the gas sticks were developed, with the aim of reducing the size and cost of manufacturing of the gas panel. Two such connection methods are described in U.S. Pat. Nos. 5,836,355, and 6,186,177.

FIG. 2, which is from U.S. Pat. No. 5,836,355 (the "'355 patent"), depicts a gas panel 200 that includes base blocks 202, manifold blocks 204, and various components 206. A significant cost of the fluid delivery system is the cost of the manifold or mounting panel on which the individual control and sensing components are mounted. In the '355 system, the mounting panel is comprised of interconnected, modular mounting blocks. Each individual component comprises at least one mounting block, with mass flow controllers requiring two. Moreover, in the system of the '355 patent, the fluid channels, which are built by connecting multiple mounting blocks, run only in two straight-line directions, which limits the flexibility in laying out the fluid channels. In addition, each different direction requires a separate layer of mounting blocks. Because of such limited flexibility and the number of mounting blocks required, the size of fluid delivery system in the '355 patent is typically quite large, rendering the cost of manufacturing such system expensive. Also, the large physical size prevents locating the fluid delivery system in close proximity to the reaction chamber to which it is supplying fluids. This results in slower response times for switching gases and in other deleterious effects associated with large dead volumes, not the least of which is a decrease in productivity.

U.S. Pat. No. 6,186,177 discloses a simplified version of the modular mounting block concept. Specifically, it discloses using a single mounting block for each gas stick, where the flow channels for the gas stick are formed in the mounting block. However, because each mounting block accommodates only one gas stick, multiple mounting blocks must be used to connect multiple gas sticks together, as illustrated in FIG. 7 of the patent. Furthermore, the flow channels in each mounting block run in only one direction, which means that connecting multiple gas sticks together appears to require additional mounting blocks with channels running in substantially perpendicular directions to those of each gas stick. Therefore, although mounting blocks of the '177 patent may provide some advantages over those described in the '355 patent, they still have many of the same size and cost disadvantages.

Therefore, there is a desire for a smaller and more cost-effective fluid delivery system, especially a smaller and more cost-effective mounting panel for such system that enables multiple gas sticks or fluid channels to be connected together.

Moreover, there is also a need for an integrated, reduced-cost mounting panel that enables channels to be routed in three dimensions (i.e., the x, y, and z axis in a Cartesian Coordinate system). Multilayered structure that enable three dimensional routing of electric signals have been used for many years in the integrated circuit, printed circuit board, and hybrid package industries. A cost-effective solution analogous to the electrical delivery system has not been applied to gas panels or fluid delivery panels because of material and manufacturing limitations. Specifically, the low levels of contamination mandated by high purity processes, such as those encountered in the semiconductor, pharmaceutical, or optical fiber industry, severely restrict the materials which can be employed as well as the fabrication techniques (for example, welding panel components together often introduces sites for corrosion or particle generation).

SUMMARY OF THE PRESENT INVENTION

The present invention includes a novel mounting panel and a novel fluid delivery system. The mounting panel comprises a top plate and a bottom plate, and it includes channels that are formed by these plates (and by any interior plates as described below), where the channels define the flow of fluid between any flow-distribution and control components mounted on the mounting panel.

Through conventional machining processes, the channels are carved out of the underside of the top plate and are enclosed by the bottom plate or an interior plate if one exists. In a complex fluid delivery system having many fluid channels, the mounting panel may include one or more interior panels with additional channels carved out of the interior plates to accommodate all routing paths. By carving channels into plates, the size and the cost of fabricating a mounting panel is significantly reduced. Moreover, it increases the flexibility in selecting a routing path for the channels, enabling one mounting panel to include channels running in two or more directions (e.g., the x and y directions in the case where only the top plate includes channels and in the x, y, and z directions where an interior plate also includes channels). The fact that channels can run in two or more directions enables two or more gas/fluid sticks to be connected and mounted on one mounting panel. In addition, the channels can be curved which provides more flexibility in designing the mounting panel and allows for a more efficient layout of the channels than might otherwise be possible using only straight-line channels.

The top plate, and possibly the interior plates (depending on the design of the fluid delivery system), includes inlet and outlet ports through which fluid can flow to enter and exits the channels. The top, bottom, and any interior plates also include complementary alignment devices to align adjacent plates.

In one embodiment, the plates of the mounting panel are attached using a polymeric compound, such as benzocyclobutene (BCB). BCB demonstrates excellent compatibility with most fluids in the semiconductor industry. This novel use of BCB to attach plates in a mounting panel is more cost effective than conventional means for attaching components in a mounting panel.

Flow-control devices are mounted on the mounting panel to create a fluid delivery system. The size of the overall fluid delivery system (which includes the mounting panel) can be further reduced by using integrated, MEMS-based flow-control devices in the fluid delivery system. Examples of such MEMs devices include those described in U.S. Pat. No. 4,966,646, U.S. Pat. No. 4,821,997, U.S. Pat. No. 4,943,032, U.S. Pat. No. 5,865,417, and U.S. Pat. No. 6,149,123. However, conventional flow-control devices also can be mounted on the mounting panel.

BRIEF DESCRIPTION OF THE DRAWINGS

FIG. 9 illustrates a more detailed example of a process flow to create a fluid delivery system in accordance with the method of FIG. 8.
FIG. 10 illustrates the difference in size, weight, number of welds, etc. between the mounting panel illustrated in FIGS. 4–7 and the gas panel described in U.S. Pat. No. 5,836,355.

DETAILED DESCRIPTION OF THE PREFERRED EMBODIMENTS

Figure 1:
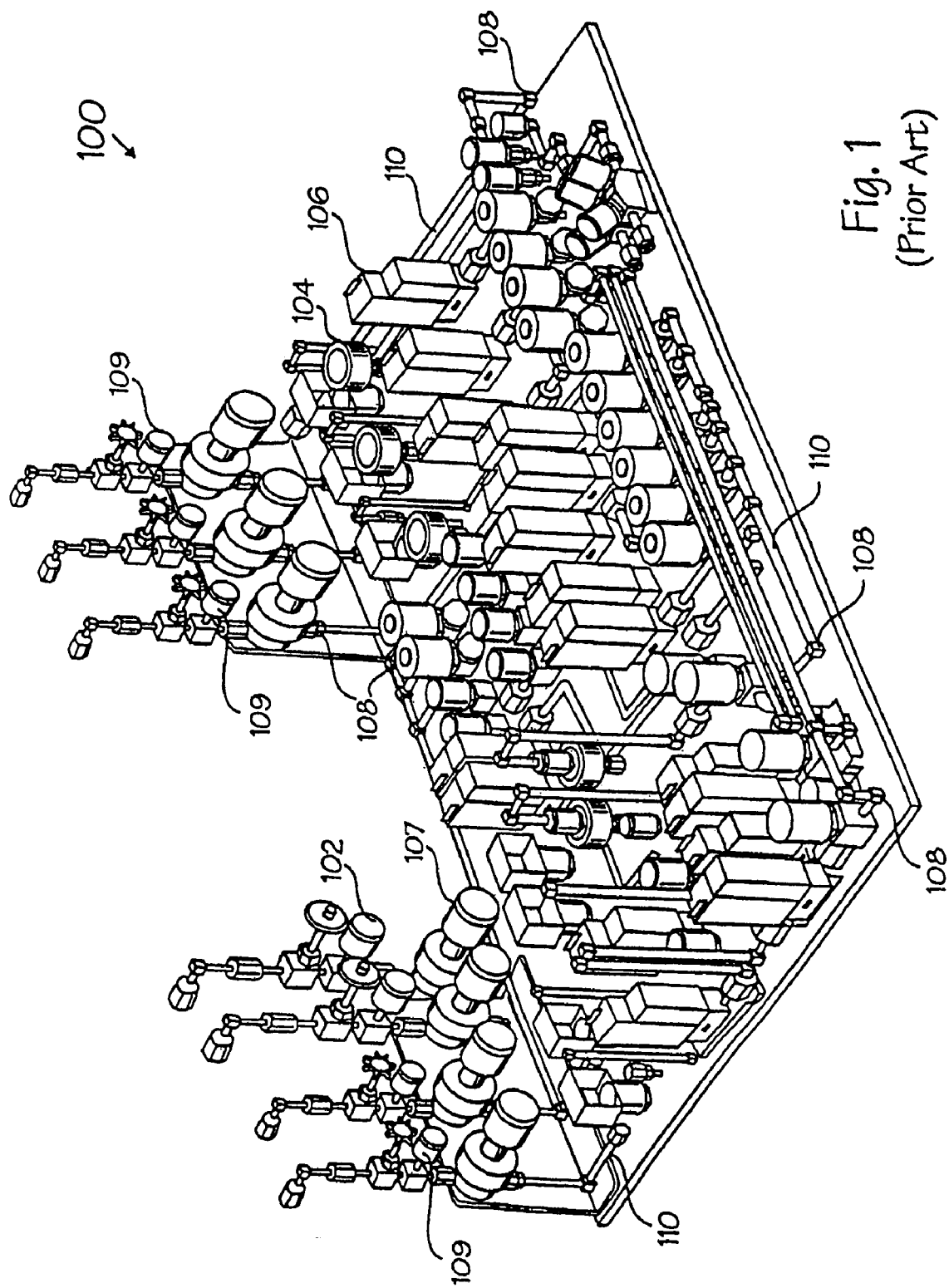
FIG. 1 illustrates a prior art gas panel.
Figure 2:
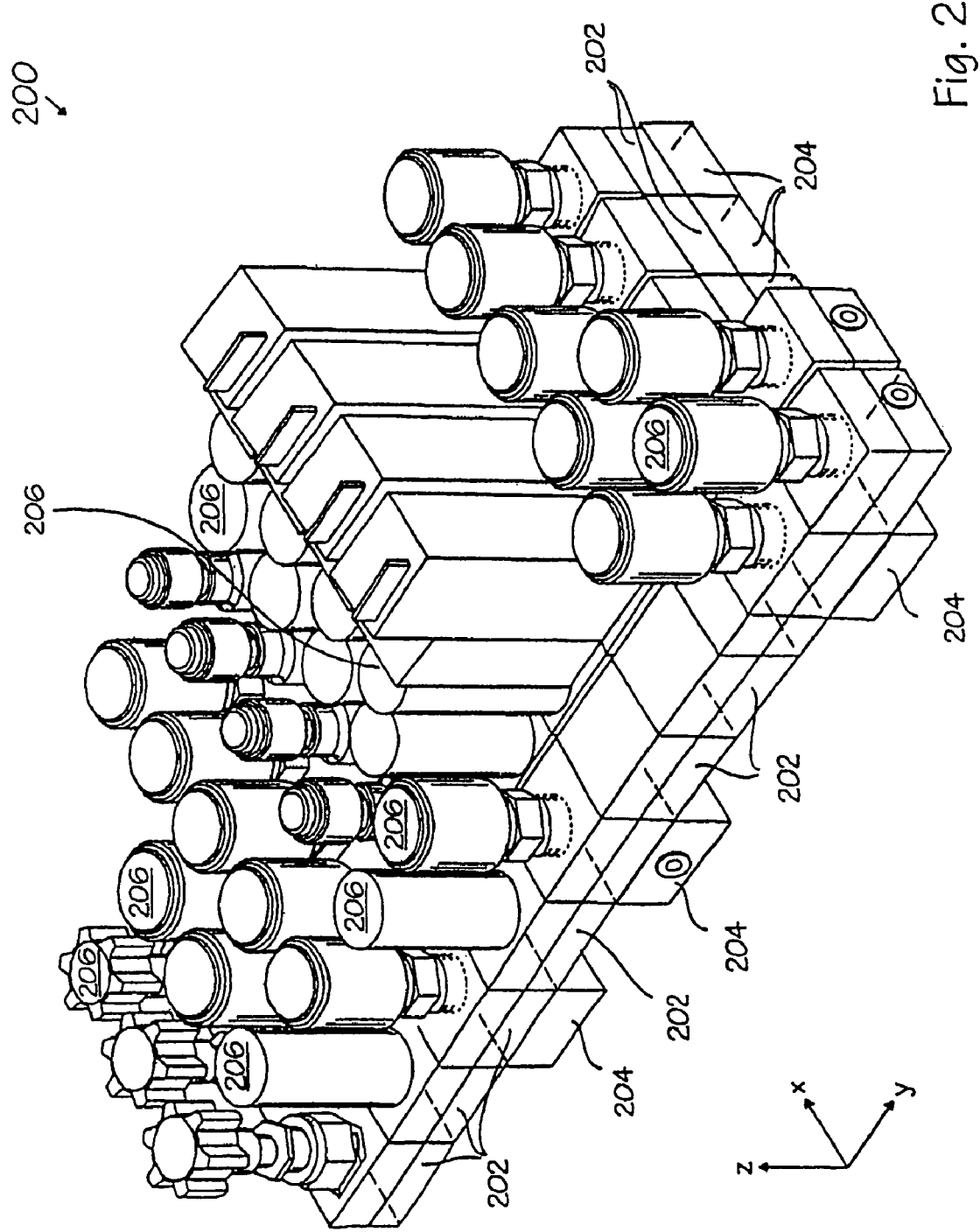
FIG. 2 illustrates another prior art gas panel.
Figure 3:
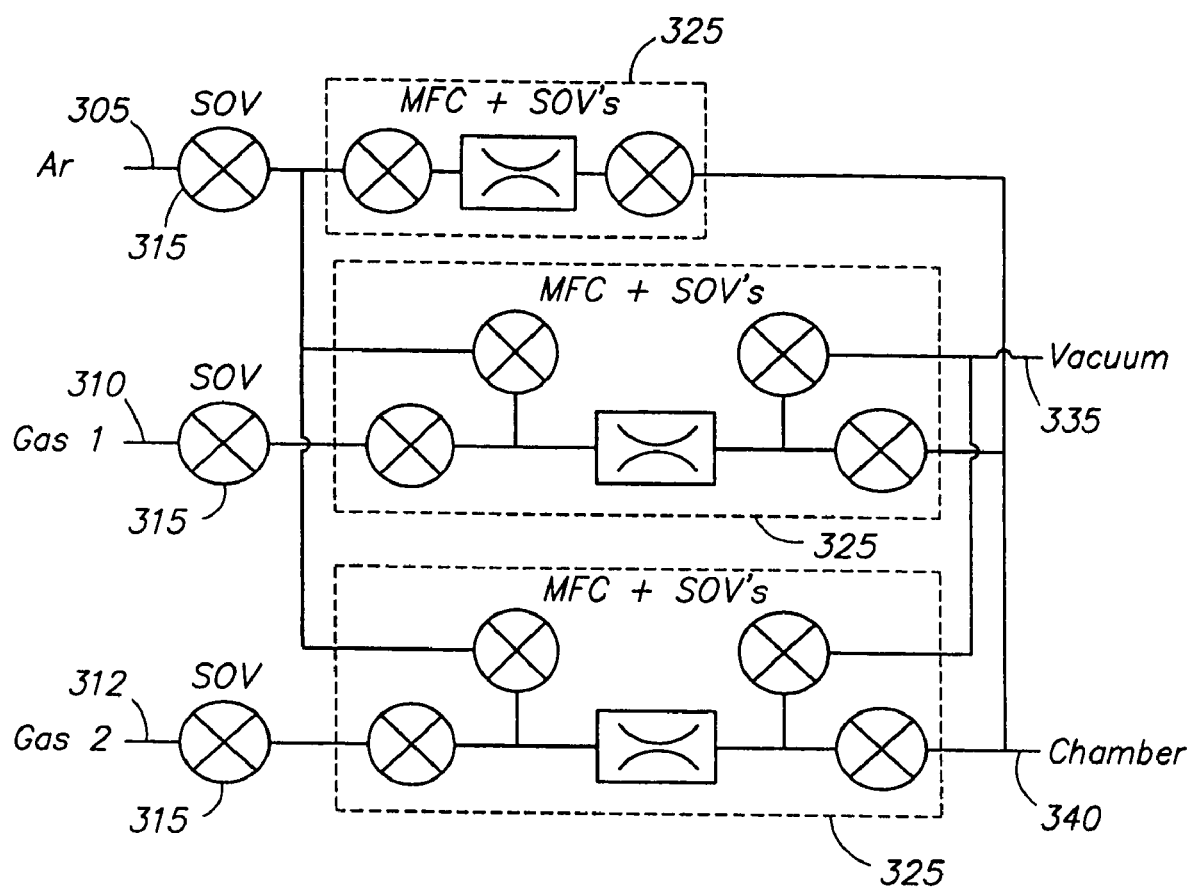
FIG. 3 illustrates a schematic for a fluid delivery system.

Similar to an electric circuit, a fluid delivery system can be represented by a schematic diagram, an example of which is illustrated in FIG. 3. The example schematic illustrates how fluids, such as liquids or gases, entering the fluid delivery system through input lines 305, 310, and 312 are routed through flow-control devices 315, 325 to output and vacuum lines 340 and 335, respectively. In this example, flow-control devices 315 and 325 are shut-off valves and combined shut-off valves/mass flow controller devices, respectively. The lines connecting the input points 305, 310, 312 to the output and vacuum lines 340, 335 represent the routing paths or "channels" through which the fluids are routed.

A fluid delivery system of the present invention includes flow-control devices mounted on a mounting panel. The type, number, and configuration of such flow-control devices will vary depending on the fluid flow requirements of each application. The fluid delivery system of the present invention is not limited to any particular configuration.

Figure 4A:
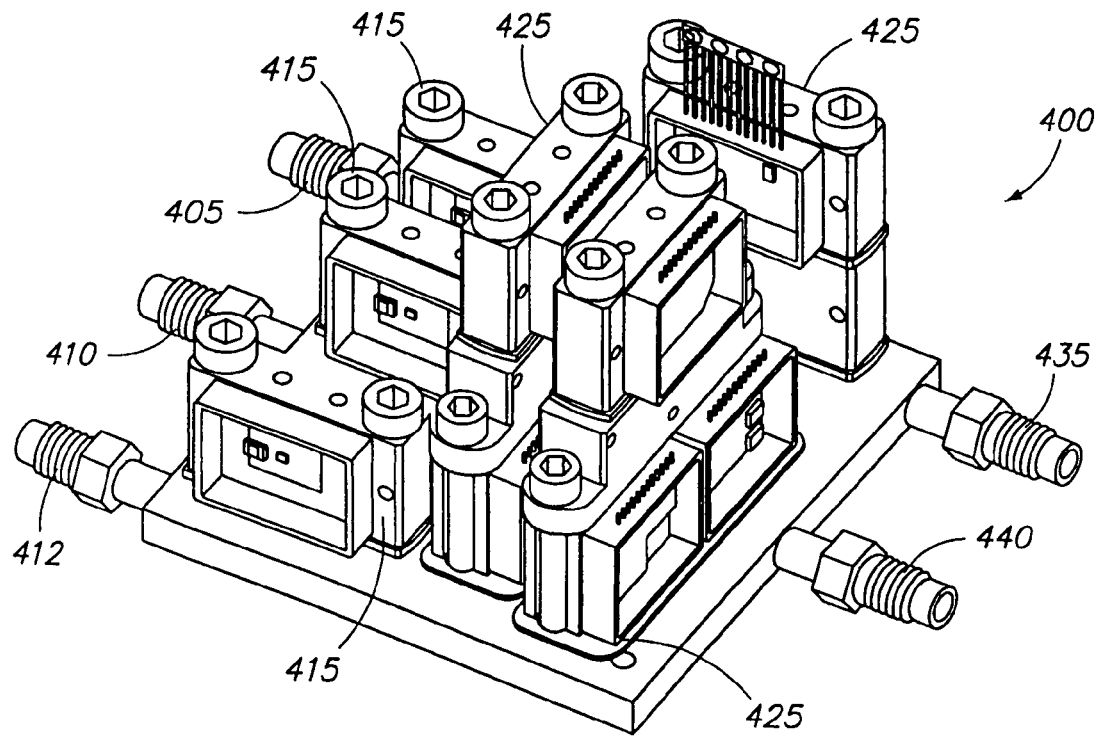
FIGS. 4a–b illustrate an example of a fluid delivery system according to one embodiment of the present invention.
Figure 4B:
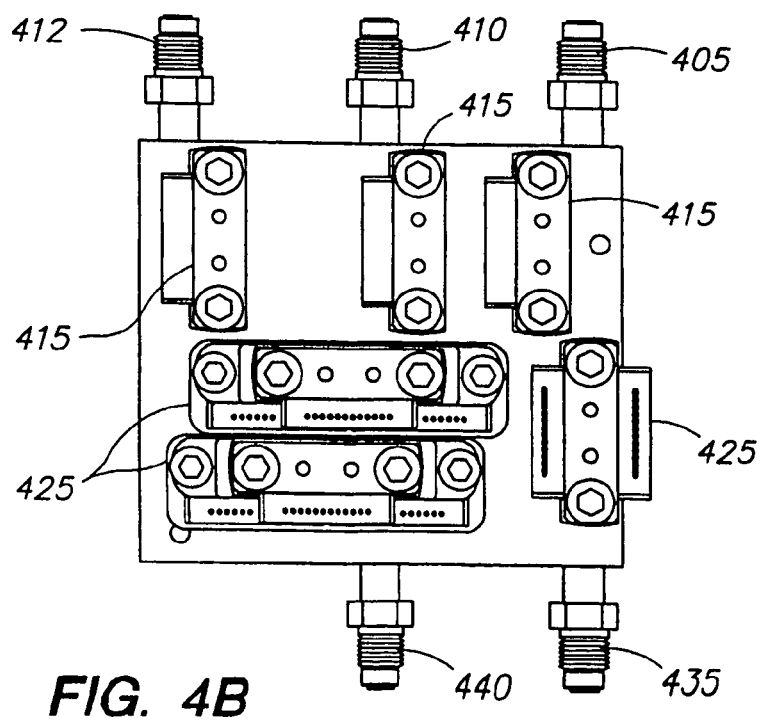

An example configuration, which implements the schematic depicted in FIG. 3, is illustrated in FIGS. 4a–4b. FIG. 4a is a three dimensional view of a fluid delivery system 400, and FIG. 4b is a two dimensional, top view of the system. The illustrated fluid delivery system 400 includes connections 405, 410, 412 to input lines; connections 440, 435 to output and vacuum lines, respectively; and flow-control devices 415, 425 mounted on a mounting panel 420. As this system corresponds to the schematic in FIG. 3, devices 415 are shut-off valves, and devices 425 are combined shut-off valves/mass flow controllers. However, as indicated above, the devices used in a fluid delivery system of the present invention can vary and may include flow-control components such as shut-off valves, mass flow controllers, measurement devices (such as temperature and pressure sensors), filters, and purifiers. The fluids flowing through devices 415, 425 travel through channels which are located in the mounting panel 420 in accordance with the flow paths depicted in FIG. 3. For simplicity, the electronics associated with the flow-control devices 415, 425 are not shown in FIGS. 4a–4b.

Figure 5:
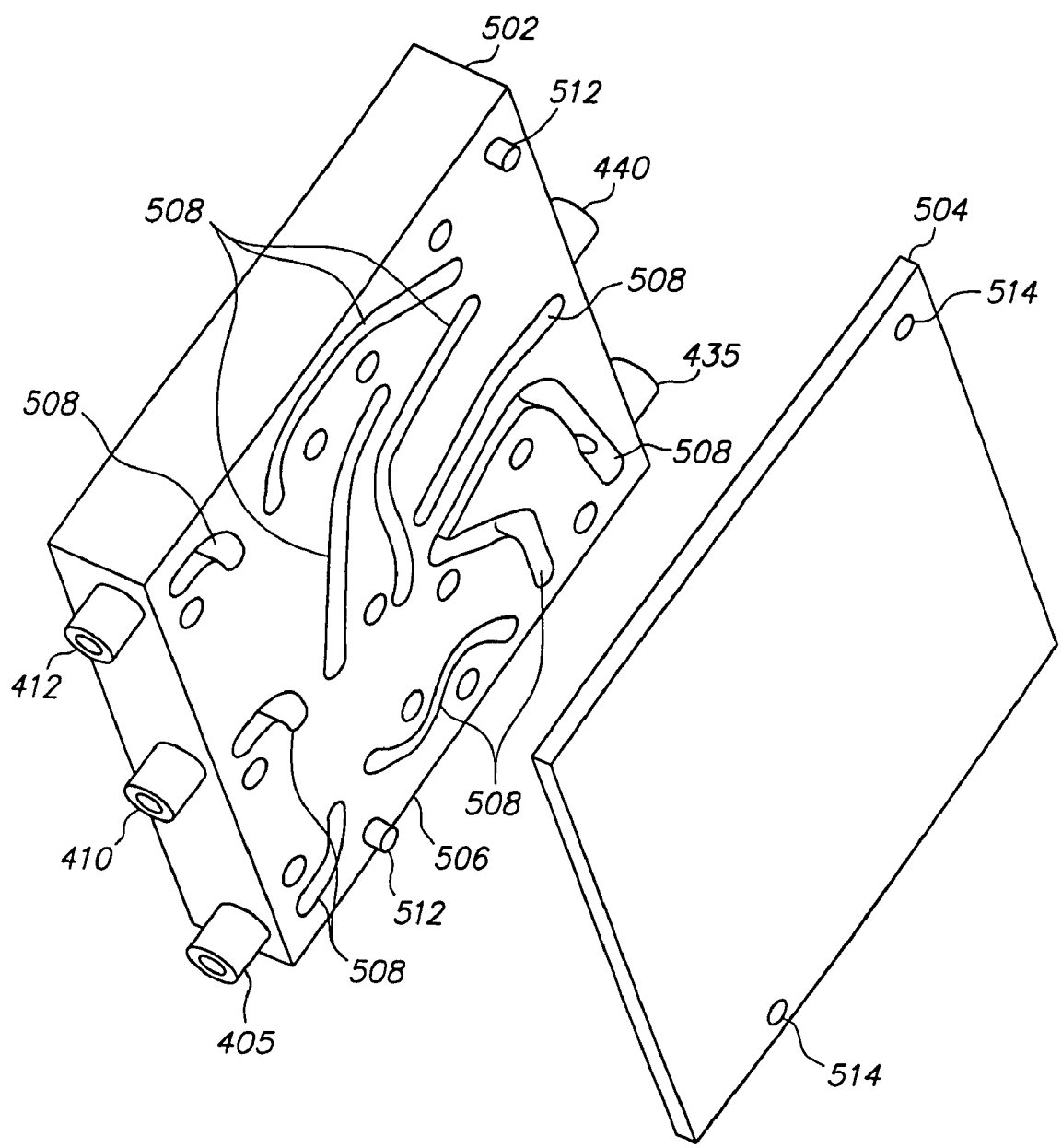
FIG. 5 illustrates a three dimensional view of an example of a mounting panel in a fluid delivery system according to one embodiment of the present invention.

FIG. 5 illustrates the mounting panel 420, which includes a top plate 502 and a bottom plate 504. The underside 506 of the top plate 502 is attached to the top side (not shown) of the bottom plate 504. To illustrate the details of each of these plates 502, 504, they are shown detached, but are attached when the mounting panel is in operation.

The underside of the top plate 502 is machined (using conventional machining techniques) with channels 508. When the fluid delivery system is in operation, fluid flows through channels 508 to travel between flow-control devices 415, 425. As shown in FIG. 5, the channels can run in two or more directions (e.g., such as the x and y directions in a Cartesian Coordinate system), enabling two or more gas or fluid sticks to be efficiently mounted on one mounting panel. Moreover, the channels can be curved, which provides further flexibility in designing the mounting panel and which likely allows for a more efficient layout of the channels.

For example purposes only, the channels illustrated in FIG. 5 correspond to the routing paths in the schematic of FIG. 3. The channels 508 can be configured in other ways to accommodate other configurations of fluid delivery systems.

Figure 6:
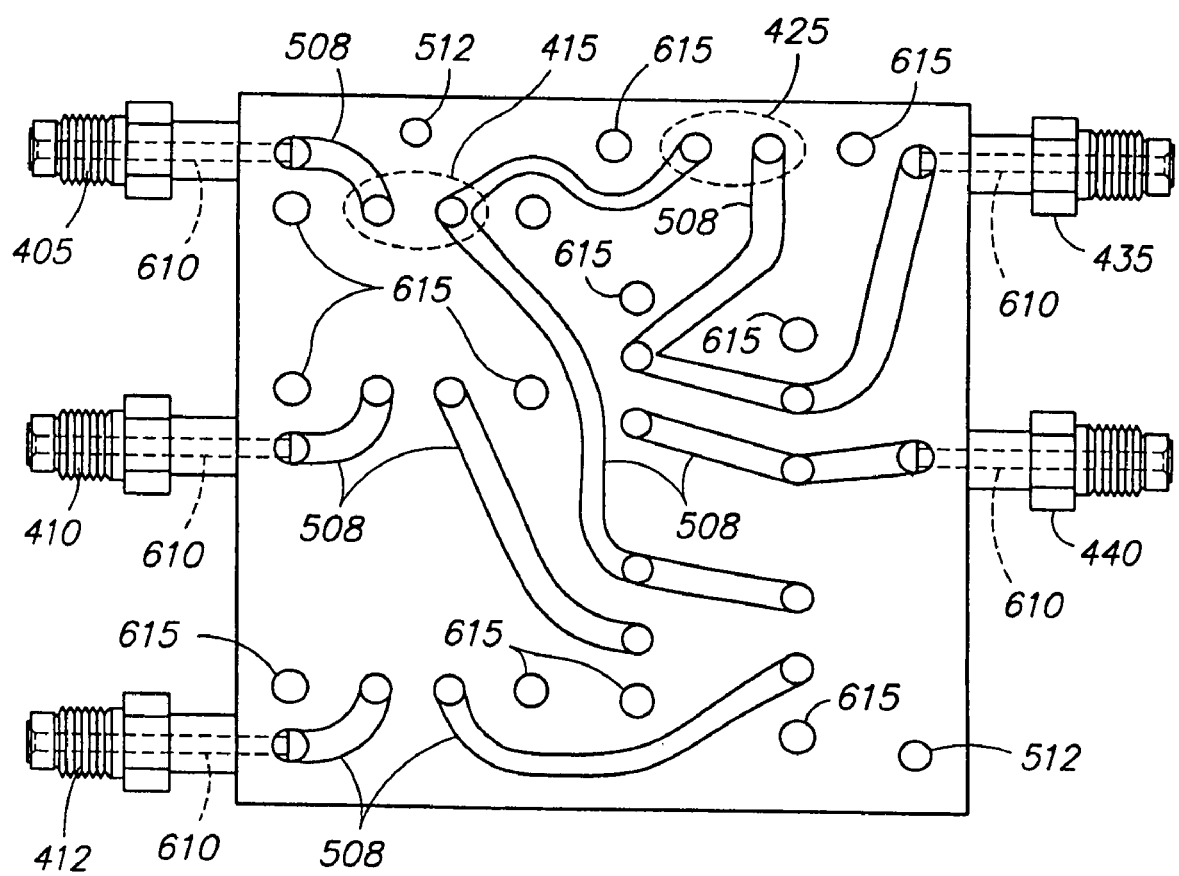
FIG. 6 illustrates a two dimensional view of the underside of a top plate in the mounting panel according to one embodiment of the present invention.

FIG. 6 illustrates a two dimensional view of the underside of the top plate 502 shown in FIG. 5. In one embodiment, the connections 405, 410, 412, 435, 440 to input, output, and vacuum lines are conventional VCR fittings that include interior tubes 610 through which fluid flows. These tubes 610 connect with the channels 508 to enable fluids to flow in and out of the fluid delivery system 400.

The top plate 502 also includes mounting devices 615 for mounting flow-control devices 415, 425 on the fluid delivery system 400. In the illustrated embodiment, the mounting devices are apertures which extend from top through the bottom of the top plate 502. Furthermore, the underside of the top plate 502 includes alignment devices 512, which, in one embodiment, are circular or cylindrical protrusions extending from the underside of the top plate 502 (see FIG. 5). The mounting devices 615 and the alignment devices 512 are formed using known machining techniques.

Figure 7A:
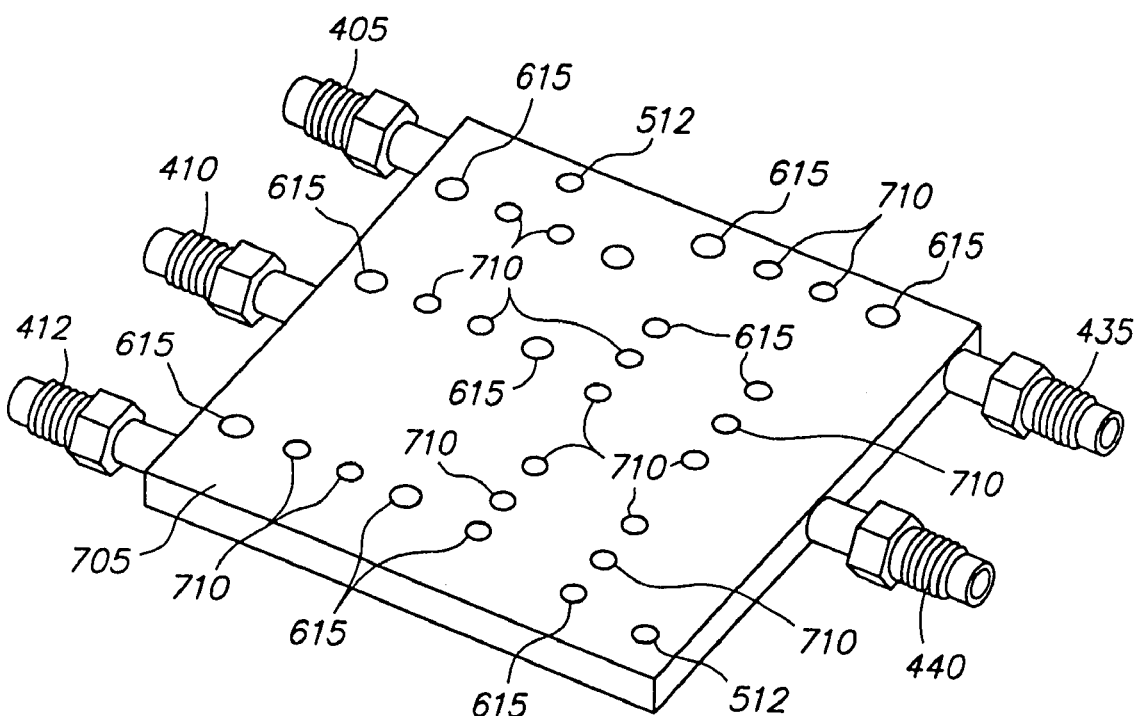
FIGS. 7a–b illustrate the topside of the top plate of the mounting panel according to one embodiment of the present invention.
Figure 7B:
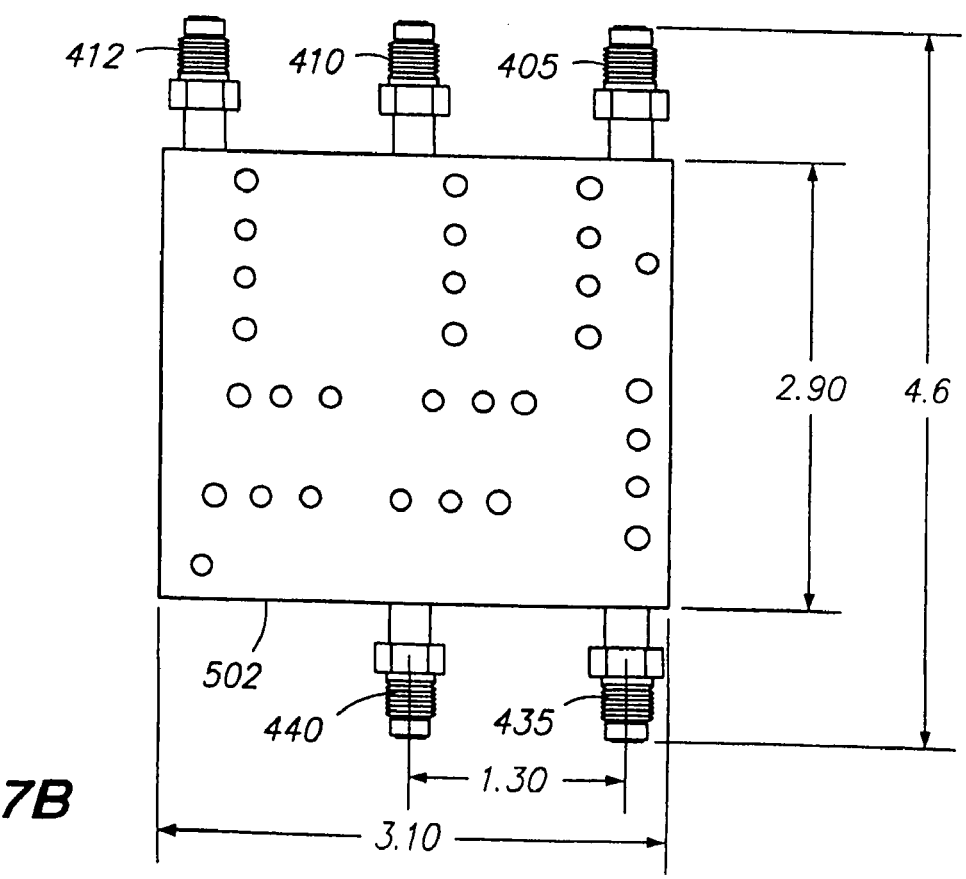

FIG. 7a illustrates a view of the top side 705 of the top plate 502. In addition to the mounting apertures 615, the top side includes inlet and outlet ports 710 through which fluid exits and enters the channels en route to and from the flow-control devices 415, 425. Inlet and output ports of the devices 415, 425 mounted on the mounting panel 420 align with the inlet and outlet ports 710 on the top plate 502. In one embodiment, the inlet and outlet ports 710 are apertures or holes, as depicted in FIG. 7a. FIG. 7b illustrates a similar view of the top plate 502 with its dimensions in inches.

The bottom plate 504 includes alignment devices 514 that are complementary to the alignment devices 512 on the underside of the top plate. The complementary alignment devices 512, 514 are used to align the bottom plate 504 to the top plate 502 when attaching the plates together. In the embodiment illustrated, the alignment devices are holes 514 that match the protrusions 512 in the top plate, although other known alignment devices can be used. Also in the embodiment illustrated, the top side (not shown) of the bottom plate 504 is identical to the underside of the bottom plate 504.

The number, location, and configuration of the connections 405, 410, 412, 435, 440, the mounting devices 615, the flow-control devices 415, 425, the alignment devices 512, 514, the inlet and outlet ports 710, and the channels 508 illustrated in FIGS. 4–7 are only an example. The number, location, and configuration of these elements in a fluid delivery system of the present invention will vary depending on the flow requirements of each fluid delivery system.

Moreover, the mounting panel of the present invention can be designed for a fluid delivery system that uses from one channel up to as many channels as are desired. In the example system illustrated in FIG. 3, all the channels can be formed in one plate (i.e., the top plate 502) even though fluid lines "cross over" each other. In larger or more complex fluid delivery systems that have more fluid routing paths, the mounting panel may include additional "interior" plates that are situated in between the top plate and the bottom plate. In such cases, additional channels are formed in the interior plates to accommodate all the routing paths. Each additional interior plate provides another means for the fluid channels to cross over one another. With an interior plate, fluids can be routed in the x, y, and z directions. Depending on the particular routing scheme desired, the channels are machined into either (or both) the top side or (/and) the underside of the interior plates, and they are enclosed when the interior plate is attached to its adjacent plates. An interior plate may also include inlet and outlet ports for the channels (especially when the interior plate is like the top plate and has channels on the bottom side) and alignment devices for aligning the interior plate with adjacent plates.

The material out of which the mounting panel is constructed must be suitable for the application and industry in which it is employed. For most semiconductor applications, 316 L Vim Var stainless steel can be used for each of the plates in the mounting panel. The thickness of the top plate is determined by the size of the channels required for a particular fluid, as well as the internal pressure, the pressure drop, and the physical rigidity needed for the particular application. For instance, in a semiconductor application with flow rates of less than 1 liter per minute, the top plate may have a thickness of 6 mm, with a channel width of 2.5 mm and a channel depth of 2.5 mm. The bottom plate, with no channels, may be as thin as 1 mm or whatever can be conveniently manufactured or is required to conform to safety requirements. In one embodiment, any interior plates are approximately the same thickness as the top plate 502, but can vary. If channels are machined into both sides of an interior plate, a slightly greater thickness than that of the top plate may be required or desired.

It is important to keep the flow channels 508 isolated from each other, especially when reactive fluids are present. A tight bond between the plates in the mounting panel is the determining factor in achieving and maintaining the integrity of each channel. Conventional bonding techniques such as discharge, laser, or electron beam welding along the outside perimeter of each channel could be used, but likely would be considered too costly and not clean enough for high-purity applications (e.g., semiconductor). Using a gasking material around the channels and maintaining a uniform pressure over the panel is another possible way too bond the plates together, but also is likely to be considered too costly and not clean enough for high-purity applications.

The preferred method is to attach the plates using a polymeric bonding material of suitable purity, material compatibility, and physical properties. One example of such a polymeric material is benzocyclobutene (BCB), available from Dow Chemical corporation. BCB demonstrates excellent compatibility with most fluids used in the semiconductor industry. A photo-definable version of BCB can be employed if requirements so dictate.

To attach the plates, the interior-facing side of either the bottom plate (e.g., plate 504 in FIG. 5) or the top plate (e.g, plate 502 in FIG. 5) of the mounting panel is coated uniformly with the polymeric material. Alternatively, the polymeric material is dispensed around the outer edges of the flow channels formed in the top plate (and any interior plates). In the latter case, if additional hermiticity is required, the organic bonding material is circumscribed by a hermetic epoxy compound in accordance with the teachings of U.S. Pat. No. 6,325,886 B1, the contents of which are incorporated by reference as if fully disclosed herein.

If the fluid delivery system includes interior plates, these plates are bonded to adjacent plates also using the polymeric material. In such case, the polymeric material is either applied around the channels or uniformly to one or both sides of the interior plate.

The polymeric material is applied as thin as can easily be done on the applicable portion of the plates without comprising coverage or the ability to form a hermetic seal between plates. In one embodiment, the thickness of the polymeric material is about 2 microns.

For reference, FIG. 9 illustrates examples of process flows for bonding together the top and bottom plates of a mounting panel. The first process flow (under "Option 1") involves coating the interior-facing side of the top plate uniformly with BCB. The second process flow involves outlining the channels with BCB.

Figure 8:
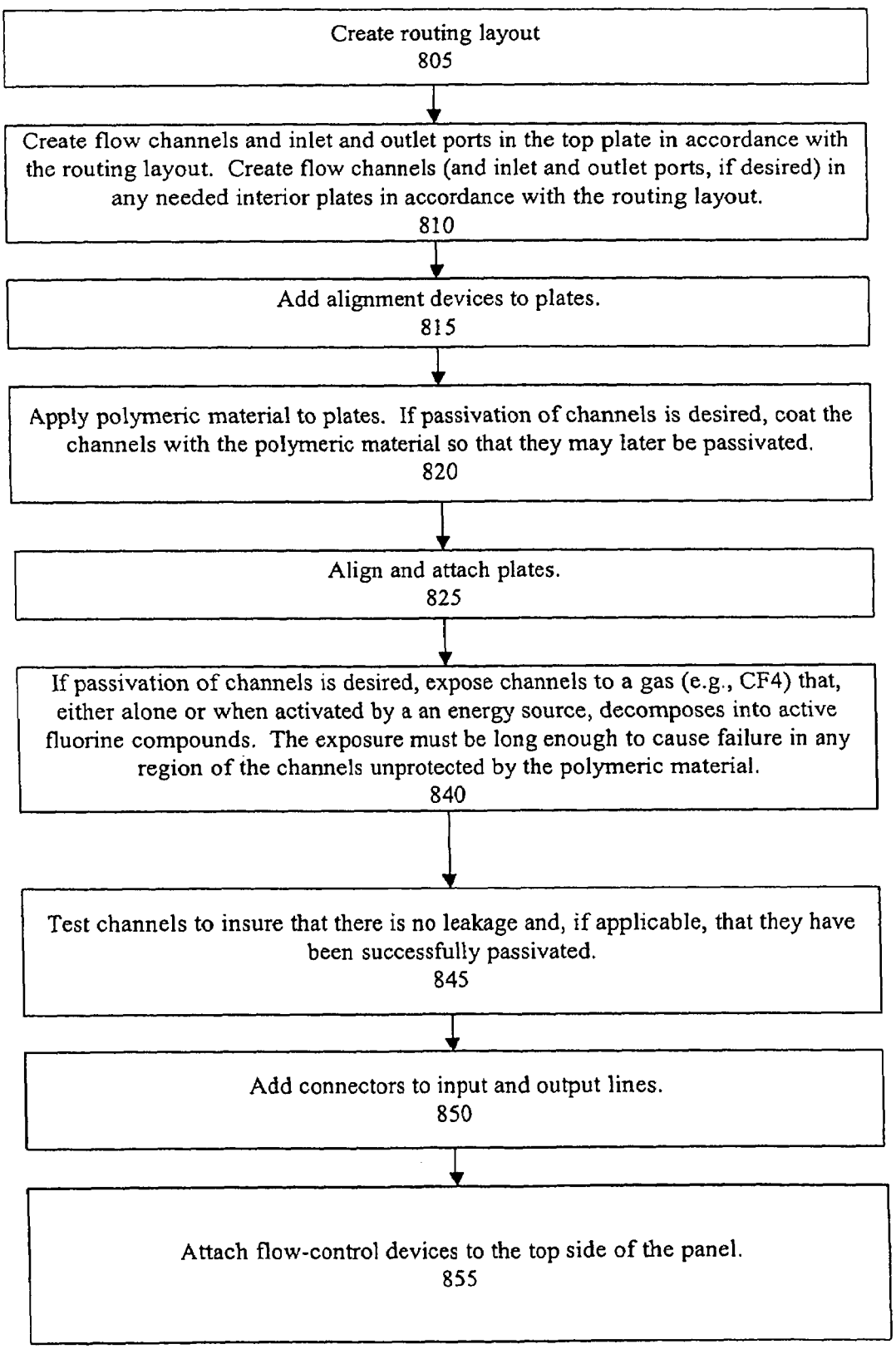
FIG. 8 illustrates a method for manufacturing a fluid delivery system according to one embodiment of the present invention.

FIG. 8 illustrates a method for making a fluid delivery system in accordance with one embodiment of the present invention. A routing layout, either in the form of a schematic diagram or otherwise, is created 805 for the flow of fluid through the fluid delivery system. Using conventional machining techniques, flow channels and inlet and outlet ports (such as channels 508 and apertures 712) are formed 810 in the top plate of the mounting panel in accordance with the routing layout. Flow channels (and inlet and outlet ports, if desired) also are formed in any needed interior plates in accordance with the routing layout. Also, alignment devices are added 815 to each of the plates.

The polymeric material is then applied 820 to the plates as described above. If passivation of the channels against corrosive fluids is desired, the channels are included in the areas covered by the polymeric material so that may later be passivated. The plates are aligned 825 using the alignment devices, attached together, and the bonding material is cured.

After attaching the plates, the channels may be passivated 840 if needed to protect them against corrosive fluids. In such case, the mounting panel (with channels covered by a polymeric material like BCB) is exposed to a gas, such as $CF_4$, that decomposes into active fluorine compounds, either spontaneously or when activated by an energy source. More information on the passivating process using a polymeric compound is set forth in U.S. Patent Application titled "Method for Producing and Testing a Corrosion-Resistant Channel in a Silicon Device," filed on Nov. 18, 2002, and assigned the Ser. No. 10/298,847, the contents of which are incorporated by reference as if fully disclosed herein. Although such patent application is directed to silicon devices, the passivation process set forth therein with respect to an organic bonding compound also may be applied to the mounting panel described herein.

Returning to FIG. 8, the channels are tested 845 to ensure their integrity if desired. More specifically, the channels can be tested to ensure that there are no leaks between channels or to the outside from the interior of the channels. Also, the passivation coating (if any) on the channels may be tested by exposing the channels to appropriate fluids and then detecting the presence of any byproducts that would result from the reaction of such fluids with exposed, uncoated portions of channels. Connectors to input lines, output lines and vacuum lines of the fluid delivery system are added 850, and flow-control devices (such as, for example, shut-off valves, mass flow controllers, filters, pressure sensors, and/or temperature sensors) are attached 855 to the top side of the top panel (using the mounting devices) as required in accordance with the routing layout. The flow-control devices may include conventional flow-control devices, as well as the MEMS flow-control devices described in U.S. Pat. No. 4,966,646, U.S. Pat. No. 4,821,997, U.S. Pat. No. 4,943,032, U.S. Pat. No. 5,865,417, and U.S. Pat. No. 6,149,123. Using MEMS devices further reduces the size of the fluid delivery system. Any associated electronics for the mounted devices are also added to the fluid delivery system.

For reference, FIG. 10 illustrates the differences in size, weight, number of welds, etc. between (1) a gas panel, which includes 12 gas sticks or gas channels, made in accordance with the teachings of U.S. Pat. No. 5,836,355 (with modular mounting blocks, as described in the "Background of Invention" section herein) and (2) a gas panel, which also including 12 gas sticks or gas channels, made in accordance with one embodiment of the present invention. Specifically, the latter gas panel includes MEMS integrated mass flow controllers and a mounting panel constructed as described herein. It is clear from this comparison, that the present invention provides substantial size and cost advantages.

As will be understood by those familiar with the art, the invention may be embodied in other specific forms without departing from the spirit or essential characteristics thereof. Accordingly, the disclosure of the present invention is intended to be illustrative and not limiting of the invention.

The invention claimed is:

1. A fluid delivery system comprising:
   flow-control devices for controlling the flow of fluid through the fluid delivery system; and
   a mounting panel upon which the flow-control devices are mounted, the mounting panel including:
      a first plate wherein one side of the first plate includes open channels that define the flow of fluid between the flow-control devices, wherein the channels run in two or more directions;
      a second plate which is attached to said one side of the first plate to enclose the channels; and
      a polymeric, compliant layer applied as a liquid that seals the first and second plates together, thereby creating a seal between the channels in the first plate, where the compliant layer is resistant to corrosion from a corrosive fluid;
      wherein the flow-control devices can be mounted on either the first plate or the second plate provided that the flow control devices are not mounted on said one side of the first plate with the open channels, and wherein a top side of the plate on which the flow-control devices are mounted includes inlet and outlet ports that extend into the channels to enable fluid to travel between the flow control devices through the channels.

2. The fluid delivery system of claim 1, wherein the first plate includes mounting devices suitable for use in mounting the flow-control devices on the mounting panel.

3. The fluid delivery system of claim 2, wherein the mounting devices are apertures extending through the top and bottom sides of the first plate.

4. The fluid delivery system of claim 1, wherein the channels correspond to routing paths for fluid flow in a schematic diagram for the fluid delivery system.

5. The fluid delivery system of claim 1, wherein the compliant layer is a polymeric compound that forms a substantially hermetic bond between the first and second plates.

6. The fluid delivery system of claim 5, wherein the polymeric compound is benzocyclobutene.

7. The fluid delivery system of claim 5, wherein the polymeric compound is applied uniformly over a side of the second plate that attaches to said one side of the first plate having the open channels, wherein said side of the second plate is bonded to said one side of the first plate.

8. The fluid delivery system of claim 7, wherein the polymeric compound is benzocyclobutene.

9. The fluid delivery of claim 5, wherein the polymeric compound is applied around the perimeter of each of the channels in the first plate and a second more hermetic organic material is applied to the outer perimeter of the first polymeric material.

10. The fluid delivery system of claim 5, wherein the polymeric compound is applied to said one side of the first plate.

11. A fluid delivery system comprising:
    flow-control devices for controlling the flow of fluid through the fluid delivery system; and
    a mounting panel upon which the flow-control devices are mounted, the mounting panel including:
       a first plate wherein one side of the first plate includes open channels that define the flow of fluid between the flow-control devices, wherein the channels run in two or more directions;
       a second plate which is attached is said one side of the first plate to enclose the channels in the first plate, wherein the second plate includes at least one additional channel that runs in a different direction than the channels in the first plate;

a third plate which is attached to said second plate to enclose the channels in the second plate;

a first polymeric, compliant layer applied as a liquid that seals the first and second plates together, thereby creating a seal between the channels in the first plate, where the first compliant layer is resistant to corrosion from a corrosive fluid; and a second polymeric, compliant layer applied as a liquid that seals the second and third plates together, thereby creating a seal between the channels in the second, where the second compliant layer is resistant to corrosion from a corrosive fluid.

12. The fluid delivery system of claim 11, wherein each of the first, second, and third plates includes alignment devices to align the plates with each other.

13. The fluid delivery system of claim 12, wherein the alignment devices are apertures.

14. The fluid delivery of claim 11, wherein the first and second compliant layers are comprised of a polymeric compound.

15. The fluid delivery system of claim 14, wherein the polymeric compound is benzocyclobutene.

16. The fluid delivery system of claim 14, wherein the polymeric compound is applied around the perimeter of each channel in each of the-first and second plates and wherein a second less permeable organic material is applied on the outer perimeter of the first polymeric material.

17. The fluid delivery system of claim 11, wherein the channels in the first and second plates enable fluids to be routed in the x, y, and z directions of a Cartesian Coordinate system.

18. The fluid delivery system of claim 1, wherein at least one of the channels has a curved shape.

19. The fluid delivery system of claim 1, wherein the channels in the first plate enable fluids to be routed in the x and y directions of a Cartesian Coordinate system.

20. A fluid delivery system comprising:

flow-control devices for controlling the flow of fluid through the fluid delivery system; and a mounting panel upon which the flow-control devices are mounted, the mounting panel including:

a first plate wherein one side of the first plate includes alignment means and includes open channels that define the flow of fluid between the flow-control devices, where the channels run in two or more directions; and a second plate which is attached to said one side of the first plate to enclose the channels and which includes alignment means complementary to the alignment means of the first plate; and a polymeric, compliant layer applied as a liquid that seals the first and second plates together, thereby creating a seal between the channels in the first plate, where the compliant layer is resistant to corrosion from a corrosive fluid;

wherein the flow-control devices can be mounted on either the first plate or the second plate provided that the flow control devices are not mounted on said one side of the first plate with the open channels, and wherein a top side of the plate on which the flow-control devices are mounted includes inlet and outlet ports that extend into the channels to enable fluid to travel between the flow control devices through the channels.

21. A mounting panel upon which fluid-control devices and measurement devices may be mounted, the mounting panel comprising:

a first plate wherein one side of the first plate includes open channels that define the flow of fluid between any flow-control devices mounted on the mounting panel, wherein the channels run in two or more directions; and a second plate which is attached to said one side of the first plate to enclose the channels; and a polymeric, compliant layer applied as a liquid that seals the first and second plates together, thereby creating a seal between the channels in the first plate, where the compliant layer is resistant to corrosion from a corrosive fluid;

wherein either the first or the second plate can be on top provided that said one side of the first plate with the open channels is not on top, and wherein a top side of the plate on top includes inlet and outlet ports that extend into the channels to enable fluid to travel from the inlet ports through the channels to the outlet ports.

22. The fluid delivery system of claim 1, wherein the second plate includes mounting devices suitable for use in mounting the flow-control devices on the mounting panel.

23. The fluid delivery system of claim 22, wherein the mounting devices are apertures extending through a top and bottom side of the second plate.

24. The fluid delivery system of claim 14, wherein the polymeric compound is applied uniformly over bonded sides of each of the first, second, and third plates.

* * * * *